United States Patent [19]
Ebihara et al.

[11] Patent Number: 5,396,050
[45] Date of Patent: Mar. 7, 1995

[54] METHOD OF JOINING STEEL SHEET BARS AND A JOINING APPARATUS

[75] Inventors: Masanori Ebihara; Toshiaki Amagasa; Toshisada Takechi; Fujio Aoki; Hideo Takekawa; Naoki Hatano; Junzo Nitta; Kunio Yoshida; Hiroyuki Yoshimura, all of Chiba, Japan

[73] Assignee: Kawasaki Steel Corporation, Hyogo, Japan

[21] Appl. No.: 844,638

[22] PCT Filed: Aug. 1, 1991

[86] PCT No.: PCT/JP91/01029
§ 371 Date: Apr. 2, 1992
§ 102(e) Date: Apr. 2, 1992

[87] PCT Pub. No.: WO92/02313
PCT Pub. Date: Feb. 20, 1992

[30] Foreign Application Priority Data

| Aug. 2, 1990 | [JP] | Japan | 2-203991 |
| Aug. 2, 1990 | [JP] | Japan | 2-203994 |
| Aug. 2, 1990 | [JP] | Japan | 2-203997 |
| Mar. 18, 1991 | [JP] | Japan | 3-077179 |
| Mar. 18, 1991 | [JP] | Japan | 3-077180 |

[51] Int. Cl.⁶ .................................... H05G 6/10
[52] U.S. Cl. ................................ 219/603; 219/617; 219/654; 219/659
[58] Field of Search ................ 219/9.5, 10.41, 10.43, 219/10.57, 10.69, 10.71, 10.79, 57, 603, 617, 611, 653, 654, 659, 645, 646; 228/151, 158, 235

[56] References Cited

U.S. PATENT DOCUMENTS

| 1,903,359 | 4/1933 | Sessions | 219/10.79 |
| 3,366,768 | 1/1968 | Osborn, Jr. | 219/9.5 |
| 4,300,031 | 11/1981 | Rgboux et al. | 219/10.41 |
| 4,706,871 | 11/1987 | Kajiwara et al. | 228/158 |
| 4,717,801 | 1/1988 | Brolin et al. | 219/9.5 |

FOREIGN PATENT DOCUMENTS

0135133 3/1985 European Pat. Off. .
63-90302 4/1988 Japan .

OTHER PUBLICATIONS

Patent Abstracts of Japan, vol. 6, No. 178 (M–155)(1056), 11 Sep. 1982.
Patent Abstracts of Japan, vol. 10, No. 365 (M–524), 6 Dec. 1986.

*Primary Examiner*—Philip H. Leung
*Attorney, Agent, or Firm*—Dvorak and Traub

[57] ABSTRACT

This invention rapidly and surely joins sheet bars to each other for continuously hot rolling in a high productivity by a combination of a treatment that the front end portion and the back end portion of these sheet bars are contacted and heated at such a contact region by applying alternating magnetic fields so as to pass in a thickness direction of the sheet bar with a treatment of pushing at least one of these sheet bars.

17 Claims, 15 Drawing Sheets

FIG_1
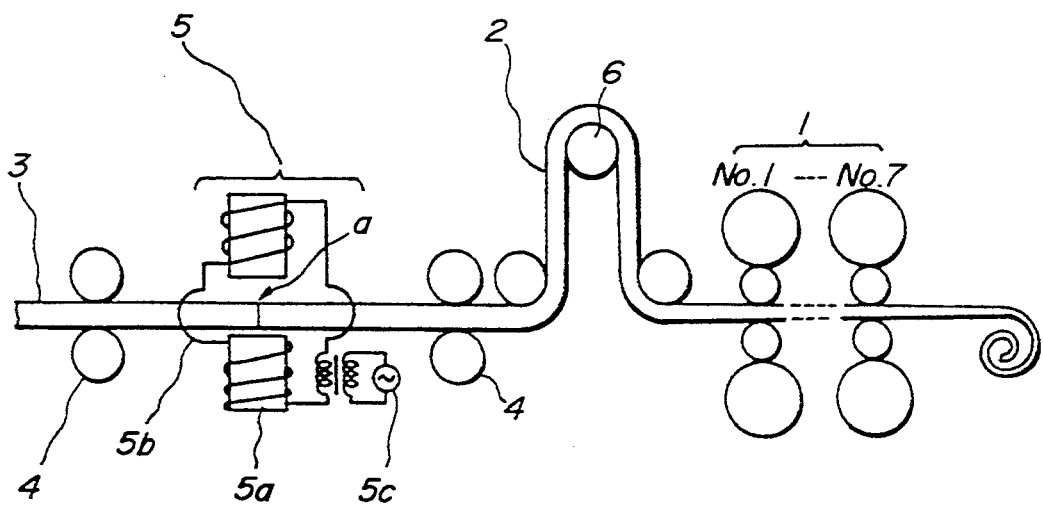
FIG_2
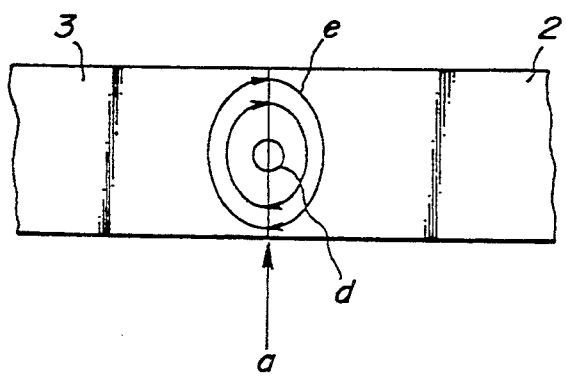
FIG_3
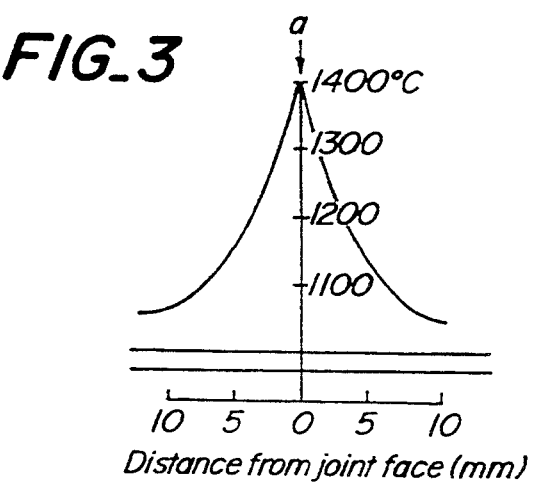
Distance from joint face (mm)

FIG_4(a)
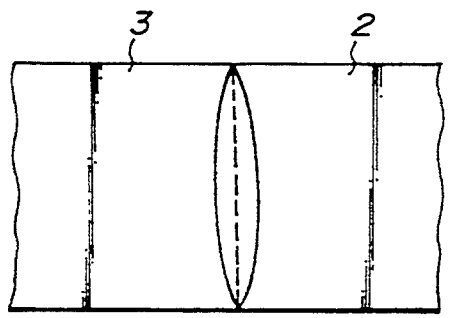
FIG_4(b)
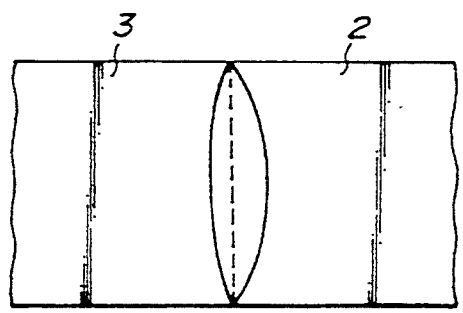
FIG_4(c)
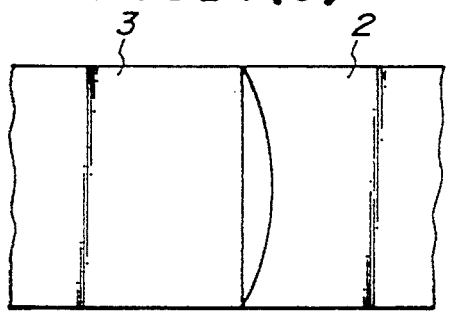
FIG_4(d)
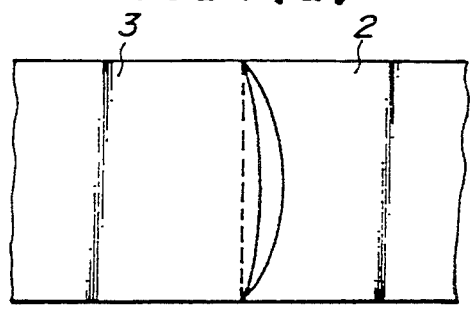
FIG_4(e)
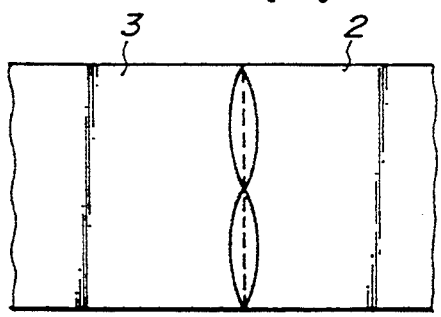
FIG_4(f)
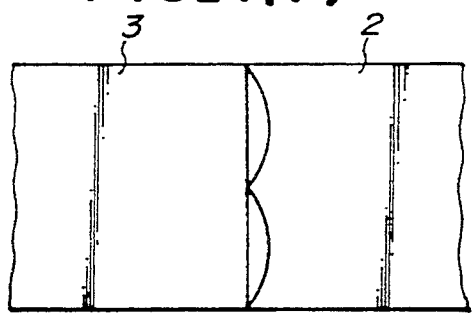
FIG_4(g)
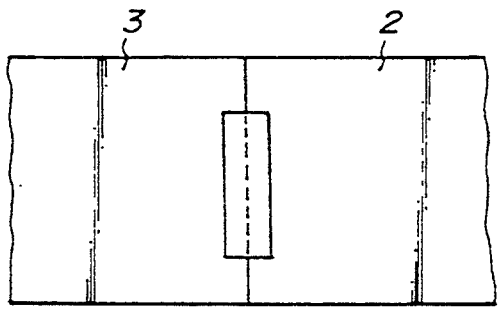

FIG_5(a)
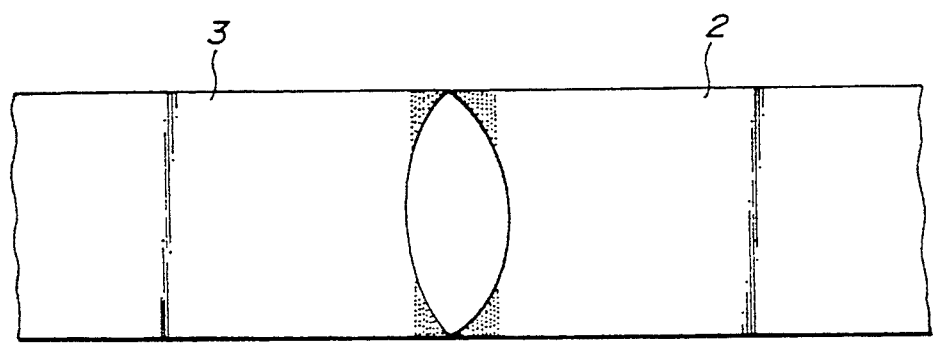
FIG_5(b)
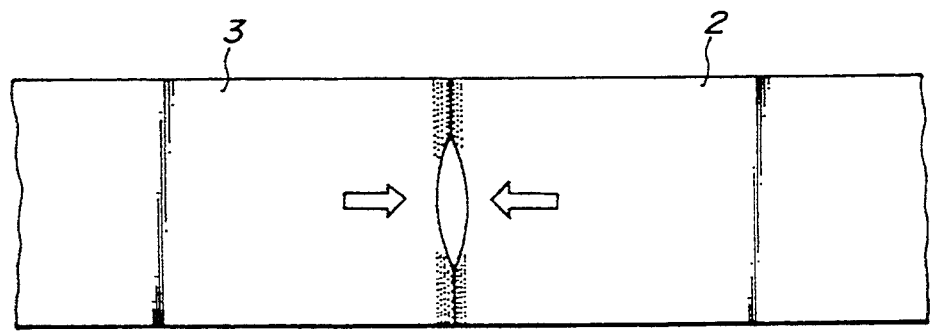

FIG_7
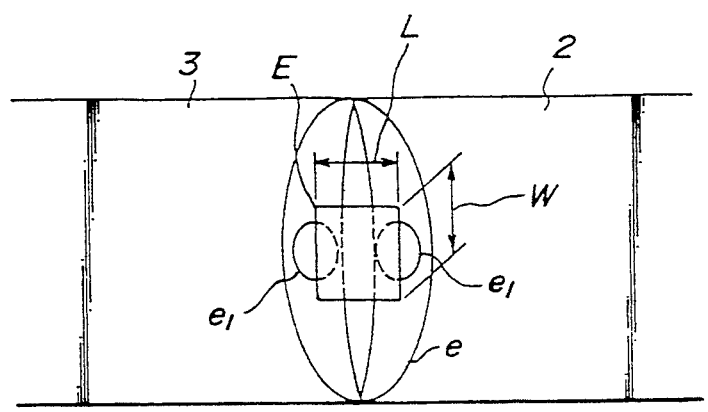
FIG_8
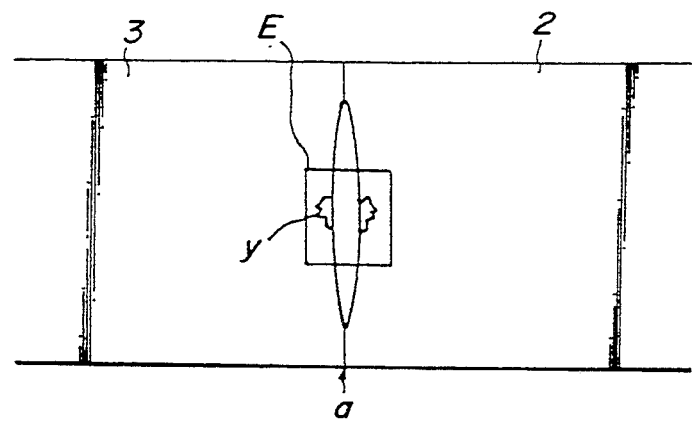

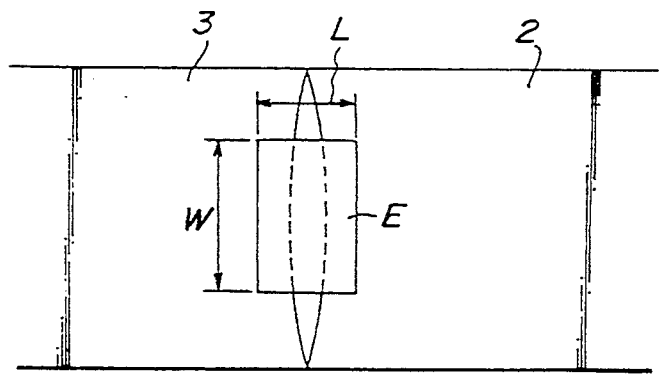
FIG_9(a)
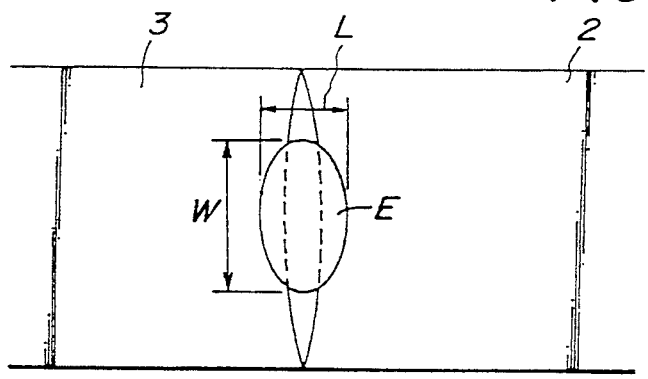
FIG_9(b)
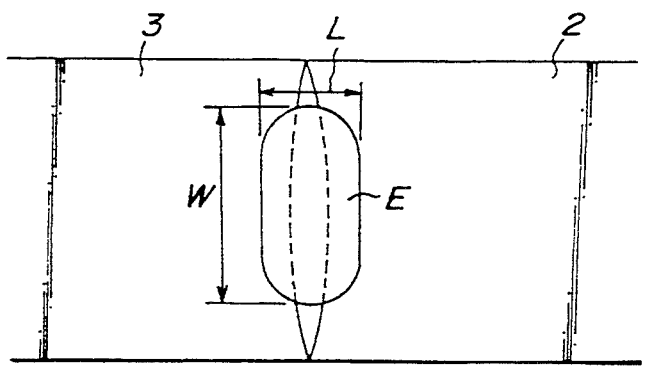
FIG_9(c)

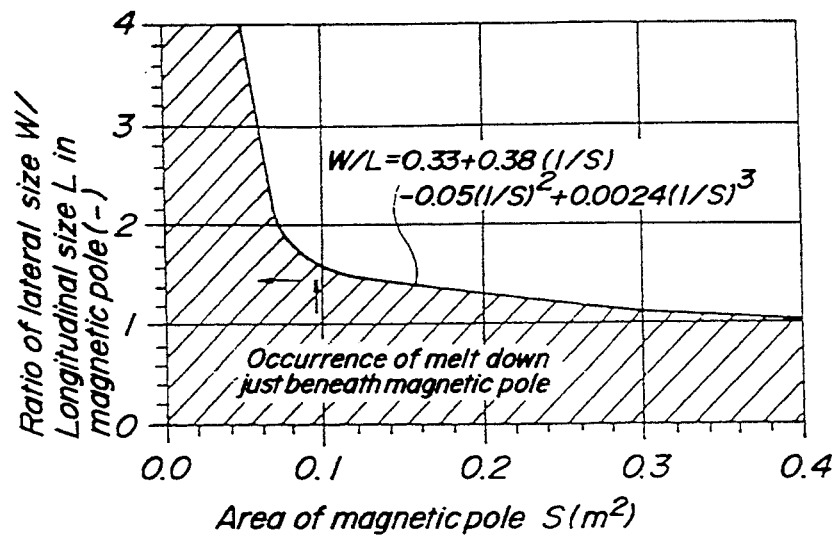
FIG_10
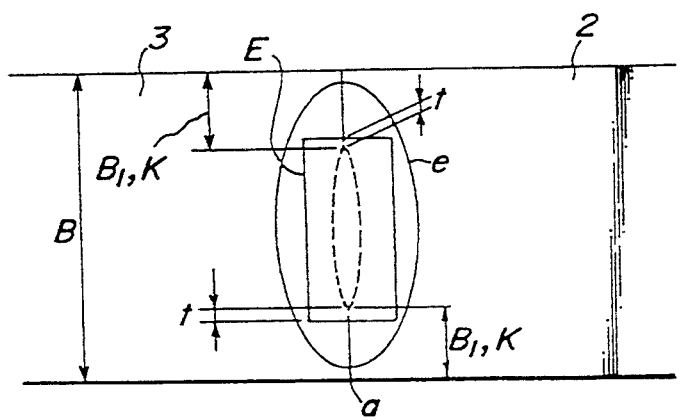
FIG_11

FIG_12
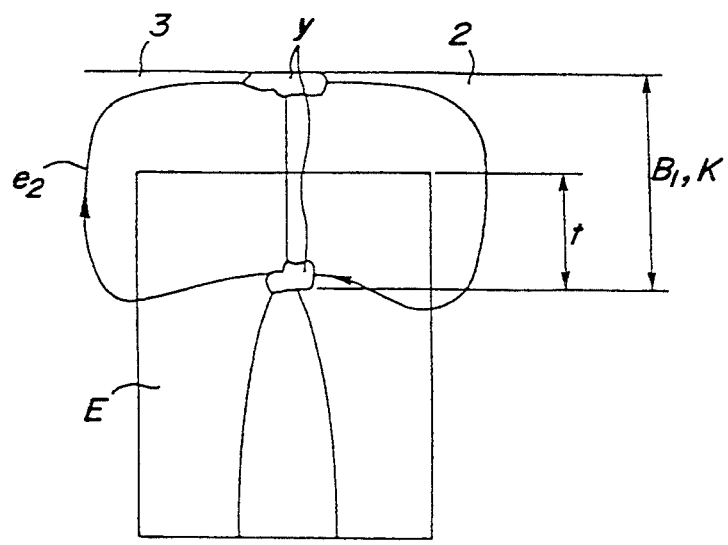
FIG_13
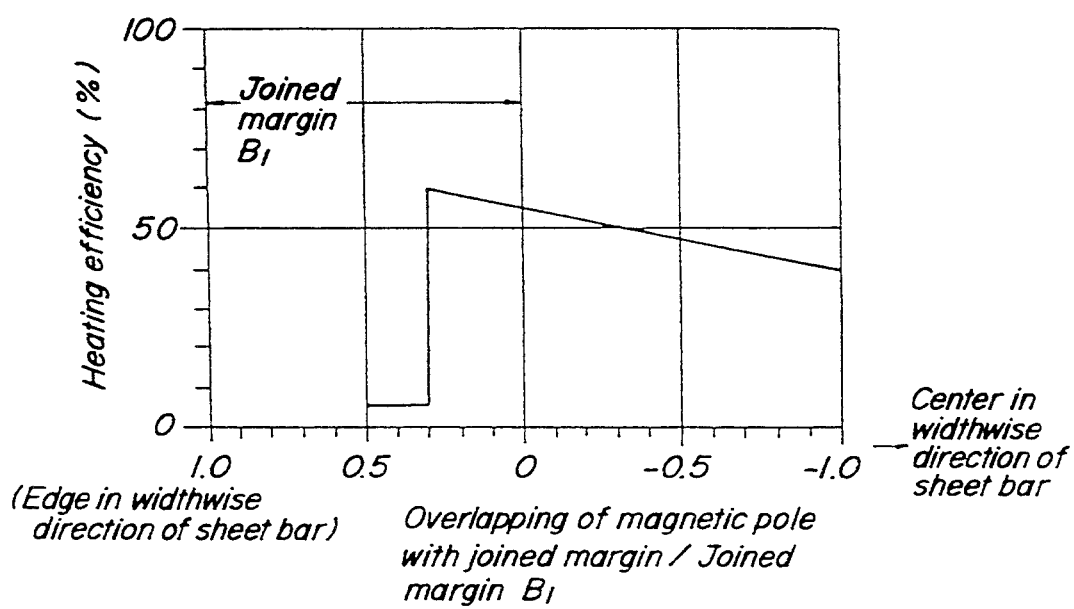

FIG_14
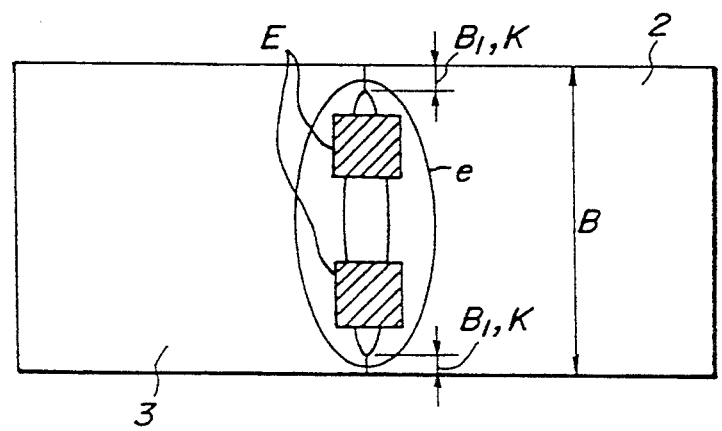
FIG_15
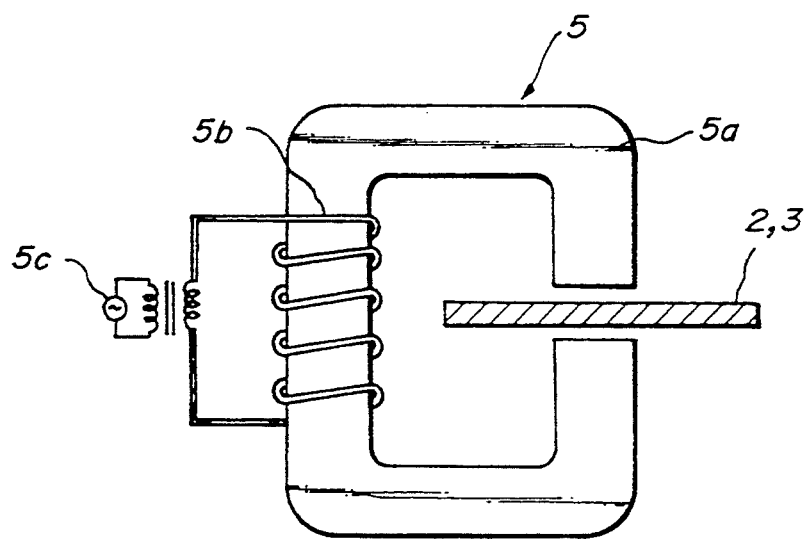

FIG_16(a)
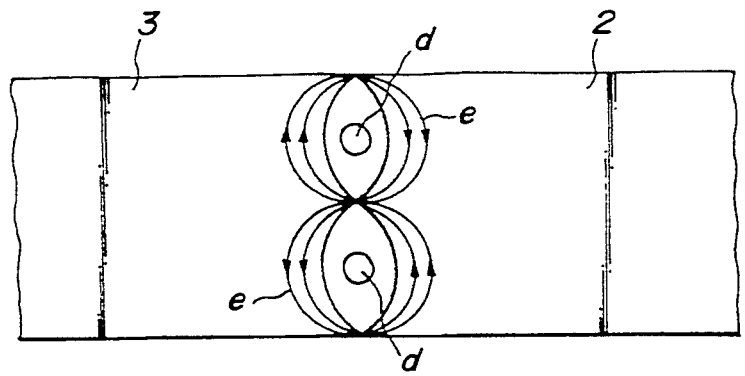
FIG_16(b)
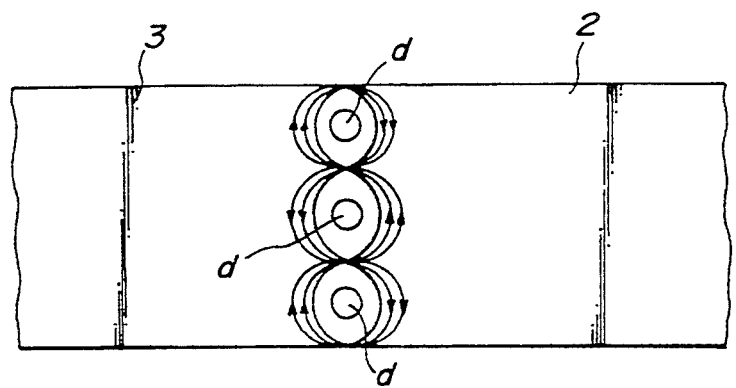
FIG_17
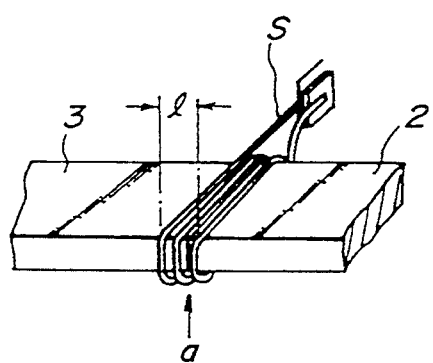

FIG_18
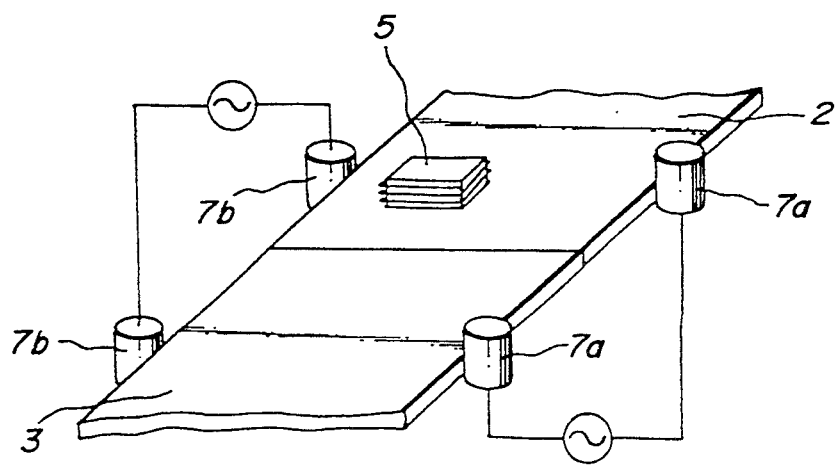
FIG_19
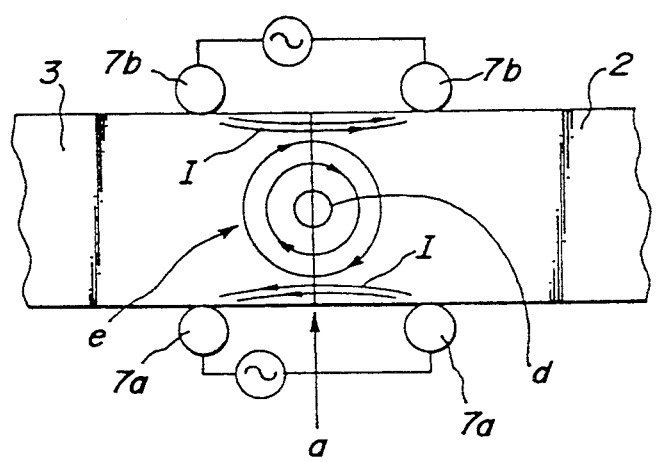

FIG_20(a)
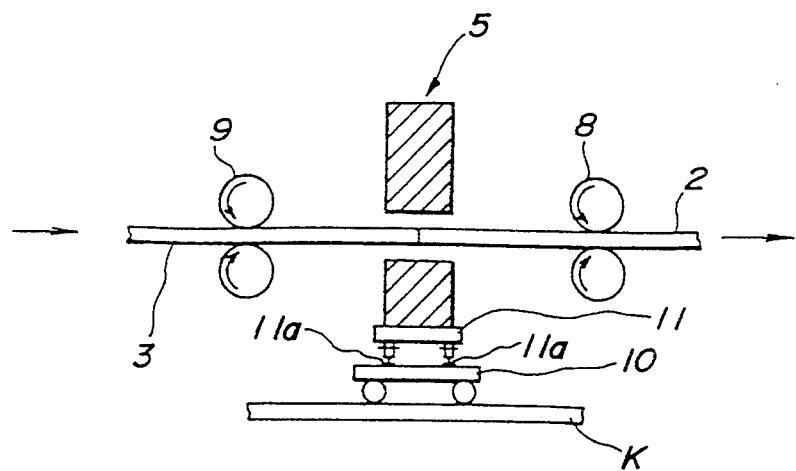
FIG_20(b)
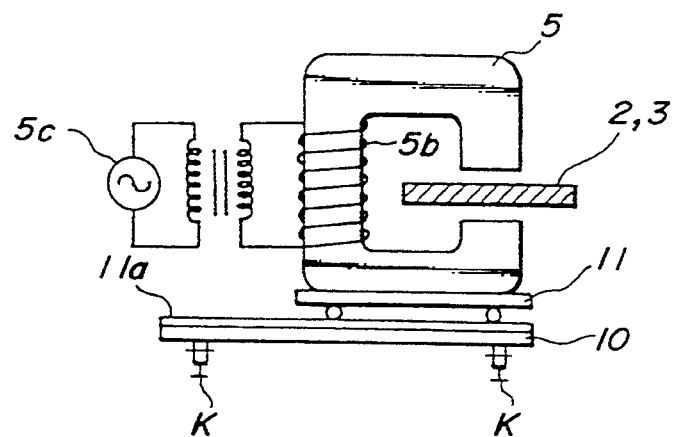

FIG_21
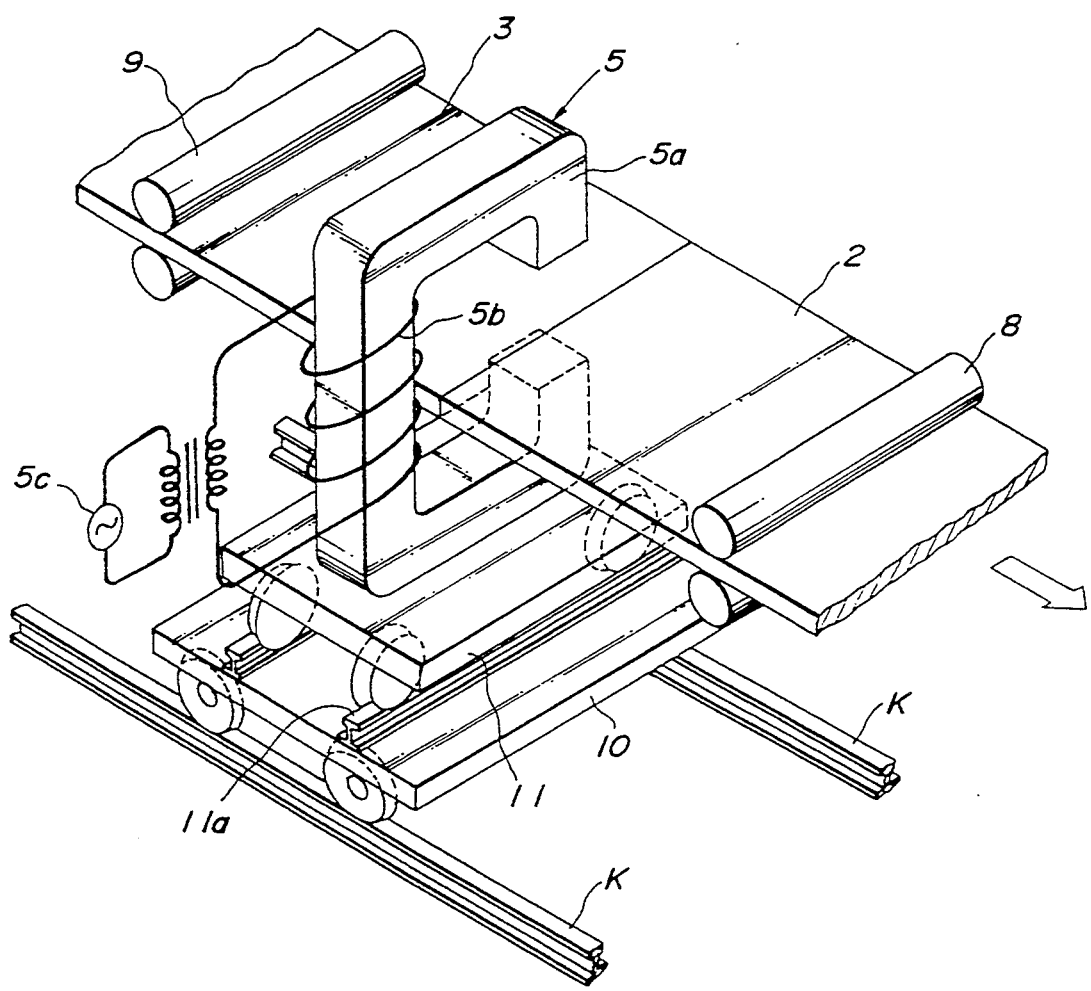

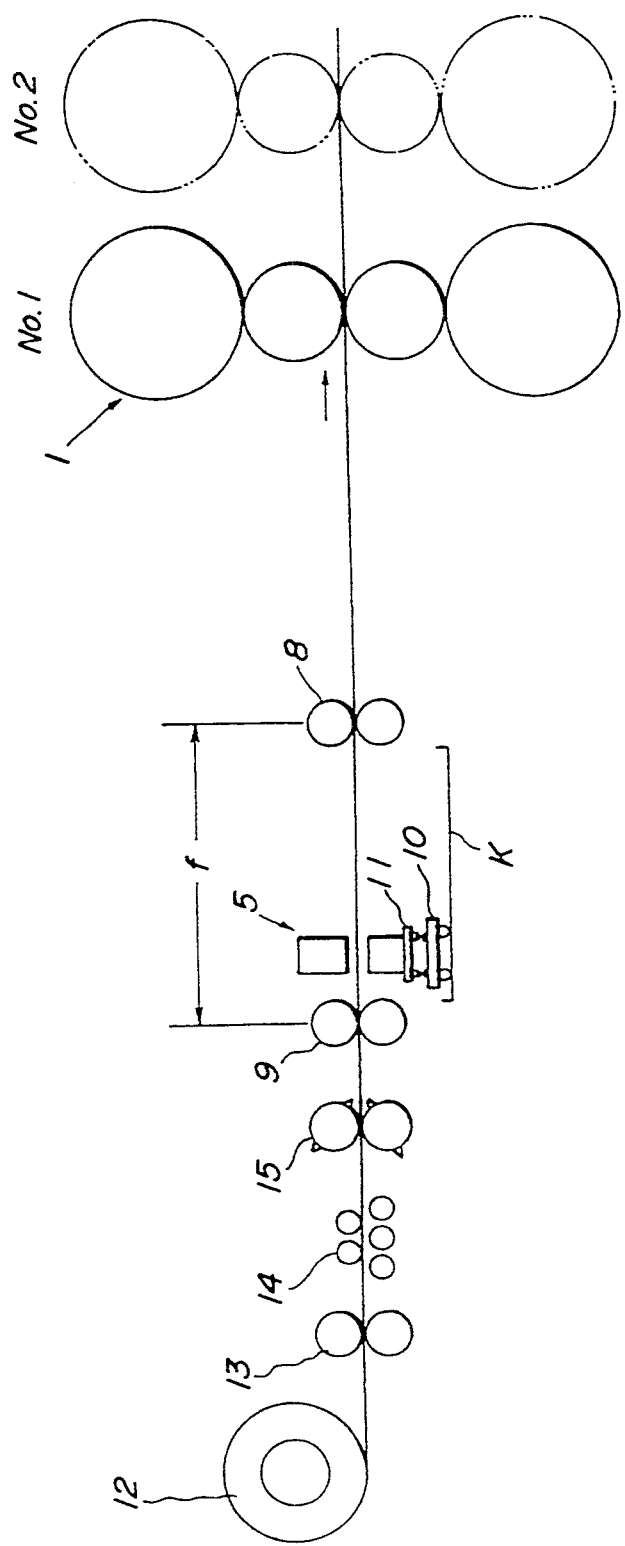
FIG._22

FIG_23(a)
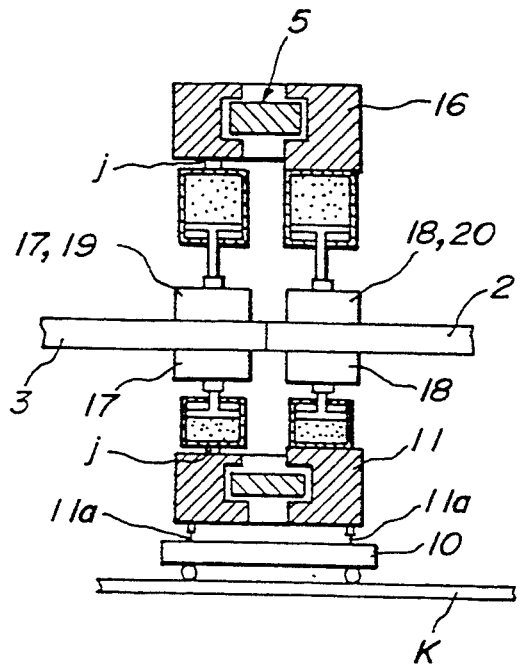
FIG_23(b)
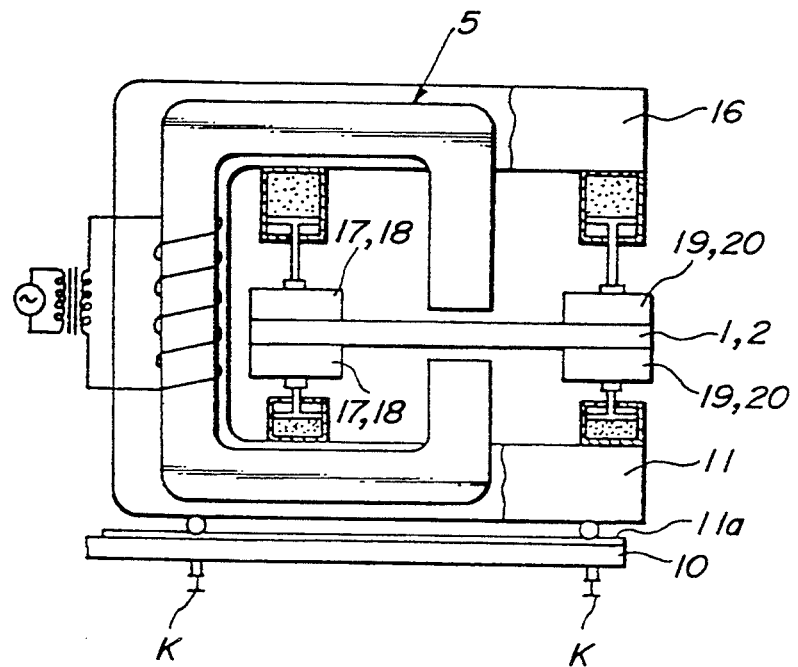

METHOD OF JOINING STEEL SHEET BARS AND A JOINING APPARATUS

TECHNICAL FIELD

This invention relates to a method of joining steel sheet bars (sheet bar, slab, billet, bloom and the like) and a joining apparatus which are particularly usable for a case that a preceding transferred sheet bar and a succeeding transferred sheet bar are butt joined at an entrance side of a hot rolling mill and the thus joined sheet bar is continuously fed into a rolling line.

BACKGROUND ART

In the conventional hot rolling line, the sheet bar to be rolled is heated to a target temperature and then fed into rough rolling step and a finish rolling step every the bar to obtain a hot rolled sheet having a desired thickness. In such a rolling system, it is apt to cause troubles such as line stopping due to poor biting of a rolling material in the finish rolling and the like, and also the lowering of yield resulted from poor shapes of front and back end portions of the rolling material is large. Therefore, it is desired to prematurely solve these problems.

As an attempt for solving the above troubles and more improving the productivity in the hot rolling line, there is proposed a rolling technique as disclosed in Japanese Patent laid open No. 60-244401 or Japanese Patent laid open No. 61-159285.

In the technique disclosed in the above publications, the back end of the preceding rolling material and the front end of the succeeding rolling material are joined at the entrance side of the finish rolling step, whereby the several to several ten rolling materials are continuously fed into the finish rolling step. According to such a rolling manner, there is caused no poor biting as generated in case of feeding the sheet bars into the rolling line every the bar and the productivity is largely improved.

However, when a high frequency heating is carried out at portions of the sheet bars to be joined as disclosed in Japanese Patent laid open No. 60-244401, the heating up to a target joining temperature can be attained in a relatively short time, but an extra region other than the region to be joined in the sheet bar is also heated, so that an energy consumption amount used therefor becomes too large. On the otherhand, when electric heating is used as disclosed in Japanese Patent laid open No. 61-159285, if a scale is adhered to the surface of the sheet bar, arc may be generated by contact electric resistance between the sheet bar and electrode roll to damage the electrode roll. In any case, these techniques are insufficient for realizing the continuous hot rolling of the sheet bar.

As to the joining apparatus of the sheet bars, the formation of large-size apparatus is not avoided in the conventional technique, so that it is difficult to apply such an apparatus to the existing line, and also the structure itself becomes complicated, which is poor in its maintenance.

It is an object of the invention to provide a novel joining method capable of simply, rapidly and surely joining sheet bars without wastefully consuming energy and without causing breakage of joint portion between sheet bars in rolling as well as an apparatus directly used for carrying out this method.

DISCLOSURE OF INVENTION

According to the invention, there is the provision of a method of joining sheet bars in hot rolling by butt joining a back end portion of a preceding transferred sheet bar and a front end portion of a succeeding transferred sheet bar at an entrance side of a hot rolling mill, characterized in that the sheet bars are closed to each other by a combination of a treatment that the front end portion and the back end portion of these sheet bars are contacted and heated at such a contact region by applying alternating magnetic fields so as to pass in a thickness direction of the sheet bar with a treatment of pushing at least one of these sheet bars.

In FIG. 1 is shown an embodiment of a rolling apparatus suitable for carrying out the invention, wherein numeral 1 is a hot finish rolling mill, numeral 2 a preceding transferred sheet bar at an entrance side of the hot rolling mill 1 (hereinafter referred to as a preceding sheet bar), numeral 3 a succeeding sheet bar followed to the preceding sheet bar 2 (hereinafter referred to as a succeeding sheet bar), numeral 4 pinch rolls for transferring the sheet bars 2, 3 and pressurizing them in the joining, numeral 5 an alternating magnetic field generating coil for the purpose of heating a contact region a between the back end portion of the preceding sheet bar 2 and the front end portion of the succeeding sheet bar 3. The alternating magnetic field generating coil 5 comprises a core 5a forming a magnetic pole E, a coil 5b and a power source 5c. Furthermore, numeral 6 is a looper for absorbing a joining time of sheet bars. The looper 6 is omitted in a system that the alternating magnetic field generating coil 5 may be moved in synchronousness with the transfer of the sheet bar.

In the apparatus of the above structure, when an alternating magnetic field d is applied to the contact region a at a contact state of butting the back end portion of the preceding sheet bar 2 and the front end portion of the succeeding Sheet bar 3 by the alternating magnetic field generating coil 5 disposed in a position corresponding to a central portion of the sheet bar in the widthwise direction, eddy currents e are induced in each end portion of the sheet bars 2, 3 along its widthwise direction as shown in FIG. 2. Each end portion of the sheet bars 2, 3 is heated by heat generation based on the circulation of the eddy current e (hereinafter referred to as a circulating induced current e). Particularly, since the contact electric resistance is existent in the contact region a between the sheet bars, the temperature at the contact face in the end portions preferentially rises by generation of Joule's heat through the above resistance as shown in FIG. 3. so that at least one of the sheet bars 2, 3 is pushed toward the sheet bar to be joined while raising the temperature at the contact state, or the heating and temperature rising are carried out at a state of preliminarily pushing the sheet bars, whereby the contact region can efficiently be closed and joined in a very short time. Moreover, there is caused no fear of damaging the apparatus by the generation of arc because the coil is non-contact type.

In the invention, in order to advantageously conduct the above heating and joining, it is desired that the contact region between the preceding sheet bar 2 and the succeeding sheet bar 3 is at least both side edge regions in the widthwise direction of the sheet bar.

In FIGS. 4(a)–(g) are shown embodiments that the contact region a between the preceding sheet bar 2 and the succeeding sheet bar 3 is at least both side edge regions of each sheet bar and a gap is formed in a region other than the side edge regions.

The reason why the shapes shown in FIGS. 4(a)-(g) are preferable is due to the fact that when the sheet bars are joined, for example, in a flat shape as shown in FIG. 5(a), if portions of the sheet bars to be joined are heated and pushed, the joining region is enlarged from both end portions toward a central portion in the widthwise direction by a relatively small pushing force as shown in FIG. 5(b) and the joint portion is not broken at a particular joining margin even by subsequent finish rolling.

In FIG. 6 is shown results examined on a joining margin in the joining of the sheet bars having the above flat shape and a broken state of joint portion in the finish rolling. As seen from this figure, when a joining margin $B_1$ at the contact region is not less than 0.1 times of a width B of the sheet bar per one-side, i.e. not less than 0.2 times in total, there is caused no breakage of joint portion by reduction in the subsequent finish rolling and it is very advantageous to shorten the joining time.

FIG. 4(a) shows a case that the back end portion of the preceding sheet bar 2 and the front end portion of the succeeding sheet bar 3 are cut into concave shapes at the same curvature, and FIG. 4(b) shows a case that the cut front and back end portions of the sheet bars 2, 3 are concave but the curvatures thereof are different, and FIG. 4(c) shows a case that one of the cut front and back end portions is straight and only the other is concave, and FIG. 4(d) shows a case that one of the cut front and back end portions is convex and the other is concave and the curvature of the concave is somewhat larger than the curvature of the convex. In all of these cases, only both side edge regions of the sheet bars in the widthwise direction are contacted and a gap is formed in the central region, but the cut shape adaptable to the invention is not limited to the above cases. There may be used a case that the front and back end portions are contacted at three points of both side edge regions and the central region as shown in FIGS. 4(e) and (f) to form gaps therebetween, or a case that the contact points are 4 or more and gaps are formed between these points as not shown. Further, the central region in the widthwise direction may be notched into a rectangular shape as shown in FIG. 4(g).

As a cutting means for the formation of the above shapes, use may be made of shear, gas cutting, laser cutting and the like. Particularly, when the end portion of the sheet bar is cut into concave shape at a specified curvature, a drum shear having two curved edges is advantageously suitable.

In the application of alternating magnetic fields according to the invention, alternating magnetic fields are applied by a magnetic pole having such a shape that a size of the magnetic pole along the widthwise direction of the sheet bar (hereinafter referred to as a lateral size) is larger than a size of the pole along the longitudinal direction (hereinafter referred to as a longitudinal size) and particularly the magnetic pole is desirable to satisfy the following equation as a relation between aspect ratio and area:

$$W/L \geq 0.33 + 0.38(l/S) - 0.05(l/S)^2 + 0.0024(l/S)^3$$

wherein
W: lateral size of magnetic pole (m)
L: longitudinal size of magnetic pole (m)
S: area of magnetic pole (m²).

In such a joining system, the larger the induced current passing through both widthwise side edge regions of the sheet bars and circulating around the bars, the shorter the joining time. However, if the shape of the magnetic pole applying the magnetic field does not satisfy the above equation, as shown in FIG. 7, a shortcircuit induced current $e_1$ is produced just beneath the magnetic pole in addition to the circulating induced current e. As the shortcircuit induced current $e_1$ becomes large, a melt down (y) is created before the portions of the sheet bars to be joined reaches to the target joining temperature as shown in FIG. 8 and consequently not only the joining apparatus is damaged but also the circulating induced current e is reduced to undesirably take a long joining time.

According to the invention, in order to suppress the occurrence of the above shortcircuit induced current $e_1$, it is favorable to apply the alternating magnetic fields by a magnetic pole E having a flat section shape that the lateral size along the widthwise direction of the sheet bar is larger than the longitudinal size along the longitudinal direction of the sheet bar. As regards the shape of the magnetic pole, use may be made of any shapes satisfying the above conditions in addition to shapes shown in FIGS. 9(a)-(c).

In FIG. 10 are shown results examined on an influence of a relation between aspect ratio and area in the magnetic pole upon melt down of the sheet bar just beneath the magnetic pole. In the joining between the sheet bars, in order to completely prevent the melt down of the sheet bar due to the shortcircuit induced current $e_1$, it is most effective that lateral size W, longitudinal size L and area S of the magnetic pole satisfy the following relation:

$$W/L \geq 0.33 + 0.38(l/S) - 0.05(l/S)^2 + 0.0024(l/S)^3.$$

Moreover, it is desirable that the upper limit of the lateral size W of the magnetic pole does not exceed the width of the sheet bar to be joined from a viewpoint of an avoidance of excessive heating at the portion to be joined. However, if the shortcircuit induced current resulted from an overlapped margin of the magnetic pole with the sheet bar comes into problem as mentioned later, it is necessary to reduce the overlapped margin as far as possible. Moreover, the upper limits of the longitudinal size L and area S of the magnetic pole are naturally calculated from the upper limit of the lateral size W.

In the invention, when the contact region between the preceding sheet bar 2 and the succeeding sheet bar 3 is at least both side edge regions in the widthwise direction, if the occurrence of shortcircuit induced current in the portion of the sheet bar to be joined comes into problem, it is desired that the overlapped margin t of the magnetic pole with the sheet bar is restrained within a range of not more than 0.3 times of contact length K between the portions of the sheet bars to be joined (length before the heating) or a joined margin $B_1$ (length after the completion of the heating) as shown in FIG. 11.

As the overlapped margin t of the magnetic pole with the sheet bar becomes large, a shortcircuit induced current $e_2$ flows in the portions of the sheet bars to be joined in accordance with the flat shape of the sheet bar and the heating conditions as shown in FIG. 12, and consequently the joining portion is locally melted down before the whole of the joining portion reaches to the target joining temperature, which damages the apparatus and may not provide a good joined state.

In FIG. 13 are shown results examined on the heating efficiency at the portion of the sheet bar to be joined when the overlapped margin t of the magnetic pole with one side edge region of the sheet bar in the widthwise direction is varied with respect to the joined margin $B_1$.

In this experiment, the width of the sheet bar was 1000 mm, the joined margin $B_1$ (one-side) was 100 mm, the number of the magnetic poles E was 2, and the lateral and longitudinal sizes of the magnetic pole were 250 mm and 300 mm, respectively.

In FIG. 13, as the magnetic pole E becomes near to the side edge region of the sheet bar in the widthwise direction, the better the heating efficiency, but the magnetic pole E overlaps with the sheet bar. If the overlapped margin t exceeds 0.3 times of the joined margin $B_1$, the shortcircuit current $e_2$ is produced as shown in FIG. 12 to extremely lower the heating efficiency. In the invention, therefore, the overlapped margin t of the magnetic pole E with the sheet bar is restricted to not more than 0.3 times of the contact length K of the portion of the sheet bar to be joined at one side or the joined margin $B_1$ after the completion of the joining when the occurrence of such a shortcircuit induced current $e_2$ is feared.

Moreover, when a plurality of alternating magnetic field generating coils are arranged along the widthwise direction of the sheet bar to apply alternating magnetic fields through plural magnetic poles as shown in FIG. 14, it is necessary that the circulating induced currents generated by the application of the alternating magnetic fields are approximately equal at both side edge regions of the sheet bars in the widthwise direction of the sheet bar. When using a pair of the alternating magnetic field generating coils, it is needless to say that the magnetic pole has such a flat shape that the lateral size is larger than the longitudinal size in order to prevent the occurrence of shortcircuit induced current just beneath the magnetic pole.

As the joining state in the joining of sheet bars, there are considered various states, i.e. a state that the portions of the sheet bars to be joined are heated and raised to a target joining temperature and pushed at a stopped state of the heating, a state that the pushing is conducted while heating and temperature rising (provided that the portion to be joined does not exceed a melting temperature) at a time of reaching to the target joining temperature, a state that the heating is conducted at a previously pushed state of the sheet bar, and the like. In general, the temperature of the sheet bar at the joining stage is about 1000°–1100° C., so that the joining between the sheet bars somewhat proceeds only by simple pushing. In the invention, therefore, it is desirable to conduct the heating while pushing the sheet bars, whereby it is attempted to shorten the joining temperature and reduce the power required for the heating and temperature rising.

According to the invention, a system of applying the alternating magnetic fields so as to pass through the sheet bar in the thickness direction thereof, or a so-called transverse system is adaptable, and it is desirable to use an alternating magnetic field generating coil having a C-shaped core $5a$ as shown in FIG. 15. As a coil of such a transverse system, there are considered alternating magnetic field generating coils of split type and single horseshoe type sandwiching the sheet bar from up and down sides in the thickness direction. Particularly, the coil having the C-shaped core $5a$ has advantages that the moving operation is easy when it is synchronized with the movement of the sheet bar for the heating and the alignment of the magnetic pole is conducted simply and exactly.

Moreover, when the single alternating magnetic filed generating coil is used in the joining of sheet bars to be joined over full area in the widthwise direction, it is desired that the coil can be moved along the widthwise direction of the sheet bar for uniformly heating the portions of the sheet bar to be joined. As shown in FIGS. 16($a$) and ($b$), when plural portions to be joined are set along the widthwise direction of the sheet bar and the alternating magnetic fields are applied thereto, it is enough to use the alternating magnetic field generating coils in correspondence to the number of the portions to be joined.

The alternating magnetic field is different in accordance with the size of the sheet bar to be joined, but it is desirable to apply the alternating magnetic field under conditions that the power applied is about 500–3000 kW and the heating time is about 2–8 seconds.

Furthermore, the pushing force in the joining is sufficient to be about 3–8 kgf/mm² as a contact pressure, and also the heating temperature is desirable to be 1250°–1450° C.

Incidentally, FIG. 17 shows an embodiment of high frequency heating system using a solenoid type coil different from the transverse system using C-shaped alternating magnetic field generating coil according to the invention.

When the sheet bars are joined by the induction heating using such a solenoid type coil, a zone 1 facing the coil (including the longitudinal direction of the sheet bar) is particularly heated to increase the energy loss. If it is intended to conduct the heating by raising the frequency for shortening the joining time, temperature locally rises only at the surface region of the sheet bar, so that there is caused a fear of melting down only the surface region before the arrival at the target joining temperature.

In the invention, when the sheet bars are closed to each other as mentioned above, it is advantageous that the alternating magnetic fields for heating the contact region between the sheet bars are applied by at least one alternating magnetic field generating coil having a C-shaped core sandwiching the sheet bar from up and down sides in the thickness direction. Particularly, when the thickness of scale on the surface of the sheet bar is relatively thin, in order to more shorten the joining time, a current having the same phase as in the circulating induced current produced by the alternating magnetic field can be flowed into a portion of each of the sheet bar to be joined for the heating.

In FIG. 18 is shown an embodiment of arranging electrodes $7a$, $7b$ between joining portions of each of the sheet bars. When an alternating magnetic field d passing through the sheet bar in the thickness direction is applied by the alternating magnetic field generating coil 5 to a contact region a at a butt contacted state between the back end portion of the preceding sheet bar 2 and the front end portion of the succeeding sheet bar 3, as shown in FIG. 19, the circulating induced current e flows in each end portion of the sheet bars 2, 3 along the widthwise direction of the sheet bar and a current I having the same phase as in the circulating induced current e flows between the electrodes $7a$—$7a$ and between the electrodes 7b—7b, so that the temperature of the contacted portions at the contact region a having a contact electric resistance preferentially rises by the generation of Joule's heat through such a resistance as shown in FIG. 3. When at least one of the sheet bars 2, 3 is pushed toward the sheet bar to be joined while heating and temperature rising at such a contact state, or when the heating and temperature rising are conducted at a prepushed state, the sheet bars can efficiently be joined to each other in a very short time. Moreover, the shape of the portions of the sheet bars to be joined is flat in FIGS. 18 and 19, but when the joining region of the sheet bar is at least both side edge regions in the widthwise direction of the sheet bar, it is needless to say that it is advantageous to shorten the heating time and also the power applied can be more reduced.

The joining apparatus according to the invention will be described below.

The invention lies in a joining apparatus for closing a back end portion of a preceding sheet bar and a front end portion of a succeeding sheet bar to each other at an entrance side of a hot rolling mill by heating and pushing while moving in synchronousness with the transfer of each sheet bar, characterized in that at least two pairs of fixed pinch rolls, each of which pairs sandwiching the sheet bar from up and down sides in thickness direction of the sheet bar and pushing the sheet bar by its rotation, are arranged in a transfer line of the sheet bar, and a main carriage capable of moving along the transfer direction of the sheet bar, a sub-carriage disposed on the main carriage and capable of retractably moving along the widthwise direction of the sheet bar and an alternating magnetic field generating coil of transverse system fixed onto the sub-carriage and provided with a C-shaped core sandwiching the sheet bar in the thickness direction thereof are arranged in a region between the positions of two pairs of the pinch rolls. Further, the apparatus of this construction is advantageously provided with a clamping mechanism for sandwiching the vicinity of the back end portion of the preceding sheet bar and the vicinity of the front end portion of the succeeding sheet bar from up an down sides in the thickness direction and equalizing horizontal levels of these sheet bars.

An embodiment of the joining apparatus having the above construction is shown in FIGS. 20(a) and (b), wherein numerals 8, 9 are pinch rolls pushing the preceding sheet bar 2 and the succeeding sheet bar 3 and transferring them, numeral 10 a main carriage capable of moving on, for example, rails K along the transferring direction of the sheet bars 2, 3 (driving system is omitted), numeral 11 a sub-carriage. The sub-carriage 11 is placed on the main carriage 10 and retractably moves on, for example, rails 11a arranged on the main carriage 10 along the widthwise direction of the sheet bar (driving system is omitted) and fixes the alternating magnetic field generating coil 5 comprising a C-shaped core 5a, a coil 5b wound around the core 5a and a power source 5c.

In the apparatus of the above construction, the pinch rolls 8, 9 are shown as a fixed system of arranging two pairs in the transfer line of the sheet bar. Two sets of a pair of pinch rolls may be arranged on the border of the joining portion between the sheet bars. Furthermore, the single alternating magnetic field generating coil is illustrated, but the number of the coils used may be increased, if necessary.

The joining apparatus of the above construction is plainly illustrated in FIG. 21. Further, FIG. 22 shows a case that the apparatus according to the invention is applied to a hot rolling mill. In FIG. 21, numeral 12 is a box housing the coiledly wound sheet bar, numeral 13 pinch rolls for decoiling the sheet bar from the box 12, numeral 14 a correcting leveler of the decoiled sheet bar, and numeral 15 a shear for cutting the sheet bar into a given joining shape.

When the back end portion of the preceding sheet bar 2 and the front end portion of the succeeding sheet bar 3 decoiled from the box 12 are joined at the entrance side of the hot rolling mill, particularly finish rolling mill, the back end portion of the preceding sheet bar 2 and the front end portion of the succeeding sheet bar 3 are first cut into, for example, a flat shape or shapes shown in FIGS. 4(a)–(g) by the shear 14, respectively. The sheet bars 2, 3 after the cutting of the front and back end portions are continuedly transferred as they are. The rotating and driving rate of at least one of the pinch rolls 8, 9 is controlled so as to hold the back end portion of the preceding sheet bar 2 and the front end portion of the succeeding sheet bar 3 at a contact state, while the joining apparatus is moved in synchronousness with the movement of the sheet bars 2, 3 in such a manner that the magnetic pole of the alternating magnetic filed generating coil 5 locates at a center in the widthwise direction of the sheet bar and at a contact region between the sheet bars. While maintaining this state, the alternating magnetic fields are applied to the sheet bars so as to pass therethrough in the thickness direction. In the alternating magnetic field applied region is induced the circulating induced current e as previously mentioned, during which the sheet bar is heated by heat generation to a target joining temperature in a short time before the joining apparatus itself arrives at the pinch rolls 9.

In the joining of the sheet bars, the rotating and driving rate of at least one of the pinch rolls 8, 9 may be controlled at a times of reaching to the target joining temperature to push the sheet bars to each other, or the heating may be conducted while maintaining a state of previously pushing the sheet bars to each other.

Even when the joining of the sheet bars is conducted by using such an apparatus, it is particularly preferable that at least both side edge regions of the sheet bars in the widthwise direction are joined for shortening the joining time.

In the apparatus according to the invention, the main carriage 10 and the sub-carriage 11 are separately moved between the pinch rolls 8, 9 conducting the transfer of the sheet bar so that the alternating magnetic field generating coil 5 is moved in synchronousness with the movement of the sheet bar and at the time properly moved along the widthwise direction of the sheet bar, so that the joining operation in the heating and pushing of the sheet bar can be conducted simply and surely, and particularly when it is required to escape the joining apparatus from the transfer line, this requirement can rapidly cope with the retreating movement of the sub-carriage 11. Furthermore, the apparatus according to the invention can easily be applied to the existing equipment because the structure of the apparatus itself is very simple and compact and its maintenance is simple.

Moreover, when the pinch rolls 8,9 constituting the joining apparatus is a fixed system of locating at given positions in the transfer line of the sheet bar, if the distance between the pinch rolls is too long, it is a fear that the good joining can not be conducted by the deformation based on the dead weight of the sheet bar. Therefore, when the pinch rolls 8, 9 is the above fixed system, the distance f between the pinch rolls (see FIG. 22) is favorable to be about 5–8 m.

Even if the distance f is adjusted within the above acceptable range, it is a fear that the portions to be joined are shifted in up and down directions in accordance with the operating conditions and the transferring state of the sheet bar so as not to meet horizontal levels at the end portion of the sheet bars with each other. In this case, according to the invention, it is favorable to arrange the clamping mechanism sandwiching the end portion of the sheet bar from up and down sides in the thickness direction.

The construction of the clamping mechanism is shown in FIGS. 23(a) and (b). In these figures, numeral 16 is a frame, numerals 17–20 hydraulic lifting blocks each fixed to the frame 16. These lifting blocks 17–20 constitute the clamping mechanism sandwiching the sheet bar from up and down sides as a set of up and down blocks. The frame 16 supporting the lifting blocks 17–20 may integrally be united with the sub-carriage or may be split type as shown. When the end portion of the sheet bar is restrained by the arrangement of such a clamping mechanism, even if the front end and back end of the sheet bars are deformed by the dead weight of the sheet bar, the deformation can easily be corrected, and also there is caused no change of the horizontal level in the pushing of the sheet bar. Moreover, it is desirable that the lifting blocks are connected to the frame 16 through a moving means such as ball joint J or the like in order not to cause troubles in the pushing of the sheet bar even when the transferring sheet bar is sandwiched between the blocks. And also, the clamping mechanism is desirable to be provided with a position changing means capable of moving along the widthwise direction of the sheet bar even if the size of the sheet bar to be joined is changed.

BRIEF DESCRIPTION OF DRAWING

FIG. 1 is a diagrammatical view of a construction of an apparatus suitable for carrying out the invention.

FIG. 2 is a schematic view showing a joined state between sheet bars.

FIG. 3 is a graph showing a temperature distribution at a joined region between sheet bars.

FIGS. 4(a)–(g) are schematic views showing various flat shapes of sheet bars.

FIGS. 5(a), (b) are schematic views showing joined states between sheet bars.

FIG. 7 is a schematic view showing a state of generating a shortcircuit induced current.

FIG. 8 is a schematic view showing a state of melting down the sheet bar.

FIGS. 9(a), (b), (c) are schematic views showing various shapes of a magnetic pole.

FIG. 10 is a graph showing an influence of size and area changes of a magnetic pole upon melt down of a sheet bar just beneath the magnetic pole.

FIG. 11 is a schematic view of an overlapped margin t with a sheet bar.

FIG. 12 is a schematic view showing a state of flowing the shortcircuit induced current.

FIG. 13 is a graph showing a relation between overlapped margin of a magnetic pole to joined margin $B_1$ of a sheet bar at one side in the widthwise direction and heating efficiency.

FIG. 14 is a schematic view showing a relation of position between magnetic pole and sheet bar.

FIG. 15 is a diagrammatical view of an alternating magnetic field generating coil having a C-shaped core.

FIGS. 16(a), (b) are schematic views showing embodiments of arranging the alternating magnetic field generating coil.

FIG. 17 is a diagrammatical view of the conventional heating system.

FIG. 18 is a diagrammatical view showing the joining manner by a combination of heating through transverse system and electric heating.

FIG. 19 is a schematic view showing an electric heating state.

FIGS. 20(a), (b) are diagrammatical views of the construction of the joining apparatus according to the invention.

FIG. 21 is a perspective view of the joining apparatus according to the invention.

FIG. 22 is a schematic view showing an embodiment of applying the joining apparatus according to the invention to a hot rolling mill of sheet bars.

FIGS. 23(a), (b) are diagrammatical views showing a construction of a preferable clamping mechanism arranged in the joining apparatus.

BEST MODE FOR CARRYING OUT THE INVENTION

Example 1

Figure 6:
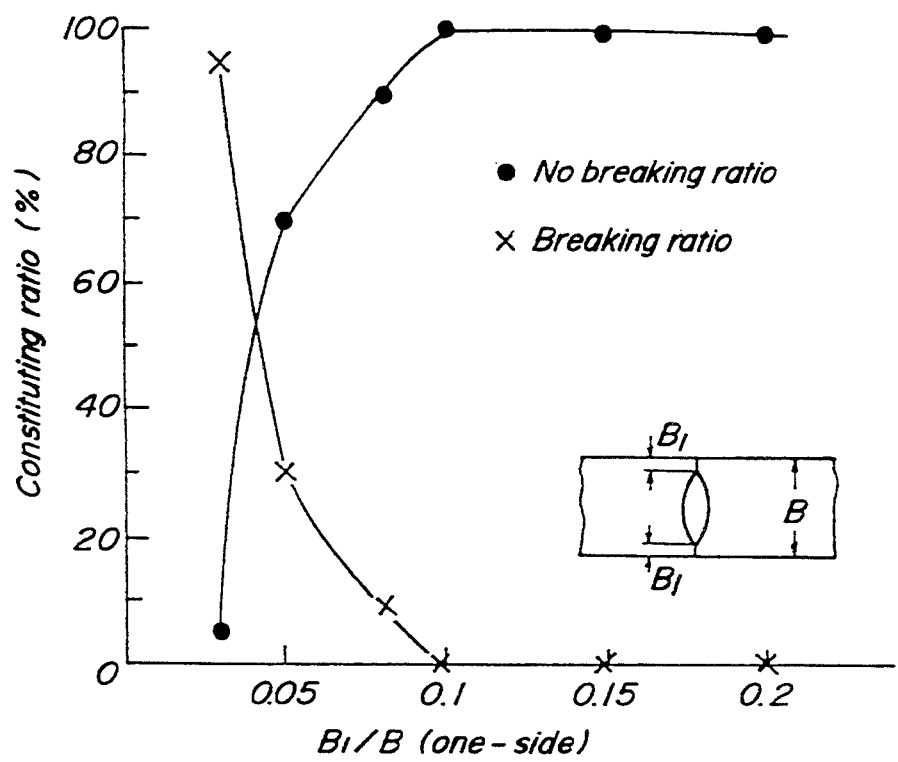
FIG. 6 is a graph showing a constituting ratio of $B_1/B$ and presence or absence of breakage.

By using an equipment provided with 7 stand tandem rolling mill as shown in FIG. 1, sheet bars (low carbon steel) each having a width of 1000 mm and a thickness of 30 mm and a flat shape as shown in FIG. 2 were joined under the following conditions and continuously fed into the rolling mill to obtain a hot rolled sheet of 3 mm in thickness.

a. alternating magnetic filed (using an alternating magnetic field generating coil provided with a C-shaped core)
  power applied: 2000 kW
  heating time: 12 seconds
  frequency: 500 Hz
  b. heating temperature: 1400° C.
  c. pushing force: 3 kgf/mm² as a contact pressure
  d. pressurizing time: 3 seconds
  e. joining state: pushing after the heating at a contact state of sheet bars
  f. movement of alternating magnetic filed along joint face As a result, the rolling could stably be conducted without breaking the joint portion in the rolling. Furthermore, it has been confirmed that the power consumption can be reduced to about 50% as compared with the joining of sheet bars having the same shape under the same conditions through the conventional high frequency heating system and also the heating time required for the joining time is 12 seconds and can be shortened to about 20% as compared with the heating time of 15 seconds through the conventional joining system under the same conditions.

Example 2

By using the same equipment as in Example 1, sheet bars (low carbon steel) of 1000 mm in width and 30 mm in thickness having a flat shape as shown in FIG. 4(a), in which radii of curvature of front end portion and back end portion were 20 m, were joined under the following conditions, during which the joined state was examined.
- a. alternating magnetic field
  power applied: 2000 kW
  frequency: 500 Hz
- b. heating temperature: 1400° C.
- c. pushing force: 3 kgf/mm$^2$ as a contact pressure
- d. joined margin in heating and pushing $2B_1 = 200$ mm (100 mm one-side)
- e. joining state: heating at a prepushed state As a result, there was caused no breakage of the joint portion in the rolling even when the joining was conducted as mentioned above. The time required for the joining was further reduced as compared with the case of joining flat front and back end portions of the sheet bars and was about 2.4 seconds. Moreover, a case that the sheet bars were heated at a contact state and then pushed was examined as a modification of only the joining of the sheet bars. In the latter case, the temperature of the joint face hardly raised as compared with the case of heating with pushing, so that the joining took a somewhat log time, but the desirable joined margin could be obtained by prolonging the heating time by about 1.6 seconds (i.e. heating time was 4 seconds in total).

Example 3

By using the same equipment as in Example 1, sheet bars (low carbon steel) of 1000 mm in width and 30 mm in thickness having a flat shape as shown in FIG. 4(a), in which radii of curvature of the front and back end portions were 20 m, were joined under the following conditions and continuously fed into a rolling mill to obtain a hot rolled sheet of 3 mm in thickness, during which the broken state of the sheet bar was examined.
- a. alternating magnetic field
  power applied: 2000 kW
  heating time: 2.4 seconds
  frequency: 500 Hz
  number of magnetic pole: 1
  shape of magnetic pole: rectangular
  lateral size of magnetic pole: 0.48 m
  longitudinal size of magnetic pole: 0.3 m
- b. heating temperature: 1400° C.
- c. pushing force: 3 kgf/mm$^2$ as a contact pressure
- d. joining state: heating with pushing at a contact state of sheet bars As a result, there was caused no melt down of the sheet bar just beneath the magnetic pole during the heating. Further, the rolling followed by the joining could stably be conducted without breaking the joint portion between the sheet bars.

In this example, when the joining of the sheet bars was conducted under the same conditions by using the magnetic pole of ellipsoidal shape, there was found no melt down of the sheet bar just beneath the magnetic pole during the heating, and also the joint portion was not broken in the rolling.

Further, the sheet bars having the same size as described above except that the width was 1.2 m were heated by the application of alternating magnetic fields through two magnetic poles arranged along the widthwise direction, during which the state of melting down the sheet bar was examined. As a result, there was found no melt down just beneath the magnetic poles during the heating, and also the joint portion was not broken in the rolling.

Example 4

By using the same equipment as in Example 1, sheet bars (low carbon steel) of 1000 mm in width and 30 mm in thickness having a flat shape as shown in FIG. 4(a), in which radii of curvature of the front and back end portions were 20 m, were joined under the following conditions and continuously fed into a rolling mill to obtain a hot rolled sheet of 3 mm in thickness.
- a. alternating magnetic field
  power applied: 2000 kW
  heating time: 2.4 seconds
  frequency: 500 Hz
  shape and number of magnetic pole:
    rectangular shape, 2 arranged along widthwise direction of sheet bar
  lateral and longitudinal sizes of magnetic pole: 0.25 m, 0.3 m
- b. joined margin $B_1$: 0.1 m one-side
- c. distance from widthwise end of sheet bar to end of magnetic pole: 0.2 m
- d. heating temperature: 1400° C.
- e. pushing force: 3 kgf/mm$^2$ as a contact pressure
- f. joining state: heating with pushing at a contact state of sheet bars As a result, the melt down was not found in the portions of the sheet bars to be joined during the heating, and also the joint portion was not broken in the subsequent rolling.

Then, when the joining of the sheet bars was conducted under the same conditions as described above except that the overlapped margin t of the magnetic pole was 0.3, the state of melting down in the portions to be joined was examined. Even in this case, there was found no melt down due to the shortcircuit induced current, and good results could be obtained at the subsequent rolling.

In the joining of the sheet bars having the same size except that the width was 1500 mm, the melt down state was examined when the joined margin was 0.2 m at one side and the overlapped margin of magnetic pole was t=0. Even in this case, there was no occurrence of melt down and good results could be obtained at the subsequent rolling.

Example 5

By using the same equipment as in Example 1, sheet bars of low carbon steel having a width of 1000 mm and a thickness of 30 mm and a flat shape as shown in FIG. 2 were joined under the following conditions using electrodes for heating the sheet bars and continuously fed into a rolling mill to obtain a hot rolled sheet of 3 mm in thickness.
- a. heating by application of alternating magnetic field
  power applied: 2000 kW
  heating time: 3.8 seconds
  frequency: 500 Hz
- b. heating by flowing current through electrodes
  power applied: 1000 kW
  heating time: 3.8 seconds
  frequency: 500 Hz
- c. heating temperature: 1400° C.
- d. pushing force: 3 kgf/mm$^2$ as a contact pressure e. pressurizing time: 5 seconds
f. joining state: heating at a prepushed state As a result, the rolling could stably be conducted without breaking the joint portions of the sheet bars in the rolling. Further, it has been confirmed that the power consumption can be reduced to about 25% as compared with the case of joining the sheet bars having the same shape under the same conditions through the conventional high frequency heating system and also the heating time required for the joining can be shortened to about ¼. As a result of the measurement of strength at the joint portion, the strength of the joint portion was equal to that of the matrix and there was observed no difference of strength in the widthwise direction.

Furthermore, sheet bars of low carbon steel having a width of 1000 mm and a thickness of 30 mm and a flat shape as shown in FIG. 4(a), in which radii of curvature of the front and back end portions were 20 m, were joined under the following conditions, during which the joined state was examined.
   a. heating by application of alternating magnetic field
      power applied: 2000 kW
      heating time: 1.9 seconds
      frequency: 500 Hz
   b. heating by flowing current through electrodes
      power applied: 1000 kW
      frequency: 500 Hz
      heating time: 1.9 seconds
   c. heating temperature: 1400° C.
      pushing force: 3 kgf/mm² as a contact pressure
   d. joined margin after heating and pushing $2B_1 = 200$ mm (100 mm at one side)
   e. joining state: heating at a prepushed state Even in such a joining, the joint portion was not broken by the rolling, and the heating time required for the joining could be shortened to about 50% as compared with the case of joining flat front and back end portions of the sheet bars. Further, when the joint portions of the sheet bars were only both side edge regions in the widthwise direction, if the sheet bars were heated to a given temperature and then pushed, the temperature at the joint face hardly raised as compared with the case of pushing and then heating and took a somewhat long time, but the desirable joined margin could be obtained by prolonging the heating time.

Example 6

Pinch rolls 8, 9 were arranged at a distance f of 6 m in a rolling equipment provided with 7 stand tandem finish rolling mill as shown in FIG. 22, and also the joining apparatus according to the invention was disposed between the pinch rolls so that the moving distance of the apparatus along the transferring direction of the sheet bar was 5 m. Then, sheet bars (low carbon steel) of 1000 mm in width and 30 mm in thickness were heated with pushing, joined and then fed into the finish rolling mill under the following conditions to obtain a hot rolled sheet of 3 mm in thickness.
   Operating conditions (heating conditions)
      power applied: 2000 kW
      heating time: 2.4 seconds
      frequency: 500 Hz
      pushing force: 3 kgf/mm² as a contact pressure (pinch roll)
      pushing time: 3 seconds
      finish rolling rate (at entrance side of the rolling mill): 60 mpm As a result of examinations on the rolled state, it has been confirmed that good continuous rolling can be conducted without breaking the joined sheet bars in the rolling.

Particularly, in the joining of the sheet bars using the clamping mechanism, the shifting between the sheet bars was not observed and good joined shape was obtained.

Industrial Applicability

According to the invention, the following effects are obtained in the continuous hot rolling while joining the back end portion of the preceding transferred sheet bar and the front end portion of the succeeding sheet bar:
① The preceding sheet bar and the succeeding sheet bar can be joined rapidly and surely, so that when the joining operation is carried out by stopping the transfer of the sheet bar at once, the stopping time of the line can be shortened and the continuous hot rolling can be realized in a higher productivity.
② When the joining operation is carried out in synchronousness with the transfer of the sheet bar, a long-scale equipment is not required.
③ The melt down can be prevented in the heating and joining of the sheet bars, so that the stable joining operation can be conducted without damaging the equipment due to the melt down.

Furthermore, the following effect are obtained in the joining apparatus according to the invention in which alternating magnetic filed generating coils retractably moving in the transfer direction of the sheet bar and in a direction perpendicular thereto are arranged between two sets of pinch rolls at the entrance side of the finish rolling mill.
① The apparatus is very compact and can easily be applied to the existing equipment.
② The construction of the apparatus is simplified, so that the maintenance can simply be conducted.
③ Even when the width size of the sheet bar is changed, the alternating magnetic field generating coil can rapidly be moved, so that the alternating magnetic filed can rapidly and exactly be applied at a desirable position in synchronousness with the transfer of the sheet bar, and consequently extra devices such as looper for absorbing a time taken for the joining of the sheet bars and the like are not required and the line can be simplified.
④ In the joining of the sheet bars, the end portions can surely be fixed by the clamping mechanism, so that these end portions are not joined at a shifted state.

We claim:
1. A method of joining sheet bars in hot rolling by butt joining a back end portion of a preceding transferred sheet bar and a front end portion of a succeeding transferred sheet bar at an entrance side of a hot rolling mill, characterized in that the sheet bars are closed to each other by a combination of a treatment that the front end portion and the back end portion of these sheet bars are contacted and heated at such a contact region by applying alternating magnetic fields so as to pass in a thickness direction of the sheet bar with a treatment of pushing at least one of these sheet bars, wherein said treatment includes the step of shaping at least one end of one of said bars to possess at least two projecting portions to establish contacts with an end of the other bar.

2. The method according to claim 1, wherein the heating is carried out at a state of pushing the sheet bars.

3. The method according to claim 1, wherein the alternating magnetic field conducting the heating at a contact region between the sheet bars is applied by at least one alternating magnetic filed generating coil provided with a C-shaped core sandwiching the sheet bar in the thickness direction thereof.

4. The method according to claim 1, wherein the heating is carried out by flowing a current having the same phase as an eddy current induced by the alternating magnetic field between the mutual sheet bars at both side edge regions in the widthwise direction of the sheet bar.

5. The method according to claim 1, wherein the alternating magnetic field is applied by a magnetic pole having a flat shape that a size along the widthwise direction of the sheet bar is larger than a size along the longitudinal direction of the sheet bar.

6. The method according to claim 3, wherein the magnetic pole satisfies a relation between aspect ratio and area according to the following equation:

$$W/L \geq 0.33 + 0.38(l/S) - 0.05(l/S)^2 + 0.0024(l/S)^3$$

W: lateral size of magnetic pole (m)
L: longitudinal size of magnetic pole (m)
S: area of magnetic pole (m$^2$).

7. The method according to claim 6, wherein the alternating magnetic field is applied by the magnetic pole, whose overlapped margin with the sheet bar being controlled within not more than 0.3 times of a contact length of portions of the sheet bars to be joined or a joined margin.

8. The method according to claim 7, wherein the heating is carried out at a state of pushing the sheet bars.

9. The method according to claim 8, wherein the alternating magnetic field conducting the heating at a contact region between the sheet bars is applied by at least one alternating magnetic filed generating coil provided with a C-shaped core sandwiching the sheet bar in the thickness direction thereof.

10. The method according to claim 9, wherein the heating is carried out by flowing a current having the same phase as an eddy current induced by the alternating magnetic field between the mutual sheet bars at both side edge regions in the widthwise direction of the sheet bar.

11. The method according to claim 5, wherein the alternating magnetic field is applied by the magnetic pole, whose overlapped margin with the sheet bar being controlled within not more than 0.3 times of a contact length of portions of the sheet bars to be joined or a joined margin.

12. The method according to claim 5, wherein the heating is carried out by flowing a current having the same phase as an eddy current induced by the alternating magnetic field between the mutual sheet bars at both side edge regions in the widthwise direction of the sheet bar.

13. The method according to claim 6, wherein the heating is carried out by flowing a current having the same phase as an eddy current induced by the alternating magnetic field between the mutual sheet bars at both side edge regions in the widthwise direction of the sheet bar.

14. The method according to claim 7, wherein the heating is carried out by flowing a current having the same phase as an eddy current induced by the alternating magnetic field between the mutual sheet bars at both side edge regions in the widthwise direction of the sheet bar.

15. The method according to claim 8, wherein the heating is carried out by flowing a current having the same phase as an eddy current induced by the alternating magnetic field between the mutual sheet bars at both side edge regions in the widthwise direction of the sheet bar.

16. The method according to claim 1, wherein the alternating magnetic field is applied by the magnetic pole, whose overlapped margin with the sheet bar being controlled within not more than 0.3 times of a contact length of portions of the sheet bars to be joined or a joined margin.

17. A joining apparatus for closing a back end portion of a preceding sheet bar and a front end portion of a succeeding sheet bar to each other at an entrance side of a hot rolling mill by heating and pushing while moving in synchronousness with the transfer of each sheet bar, characterized by means for shearing at least one end of one of said sheet bars to possess at least two projecting portions to establish contacts with an end of the other sheet bar, at least two pairs of fixed pinch rolls, each of which pairs sandwiching the sheet bar from up and down sides in thickness direction of the sheet bar and pushing the sheet bar by its rotation, are arranged in a transfer line of the sheet bar, and a main carriage capable of moving along the transfer direction of the sheet bar, a sub-carriage disposed on the main carriage and capable of retractably moving along the widthwise direction of the sheet bar and an alternating magnetic field generating coil of transverse system fixed onto the sub-carriage and provided with a C-shaped core sandwiching the sheet bar in the thickness direction thereof are arranged in a region between the positions of two pairs of the pinch, and a clamping mechanism for sandwiching the vicinity of the back end portion of the preceding sheet bar and the vicinity of the front end portion of the succeeding sheet bar from up and down sides in the thickness direction and equalizing horizontal levels of these sheet bars.

* * * * *